WORK CONVEYOR APPARATUS FOR USE WITH BUFFING OR GRINDING OR SPRAY PAINTING EQUIPMENT AND THE LIKE
Filed Jan. 29, 1962 4 Sheets-Sheet 1
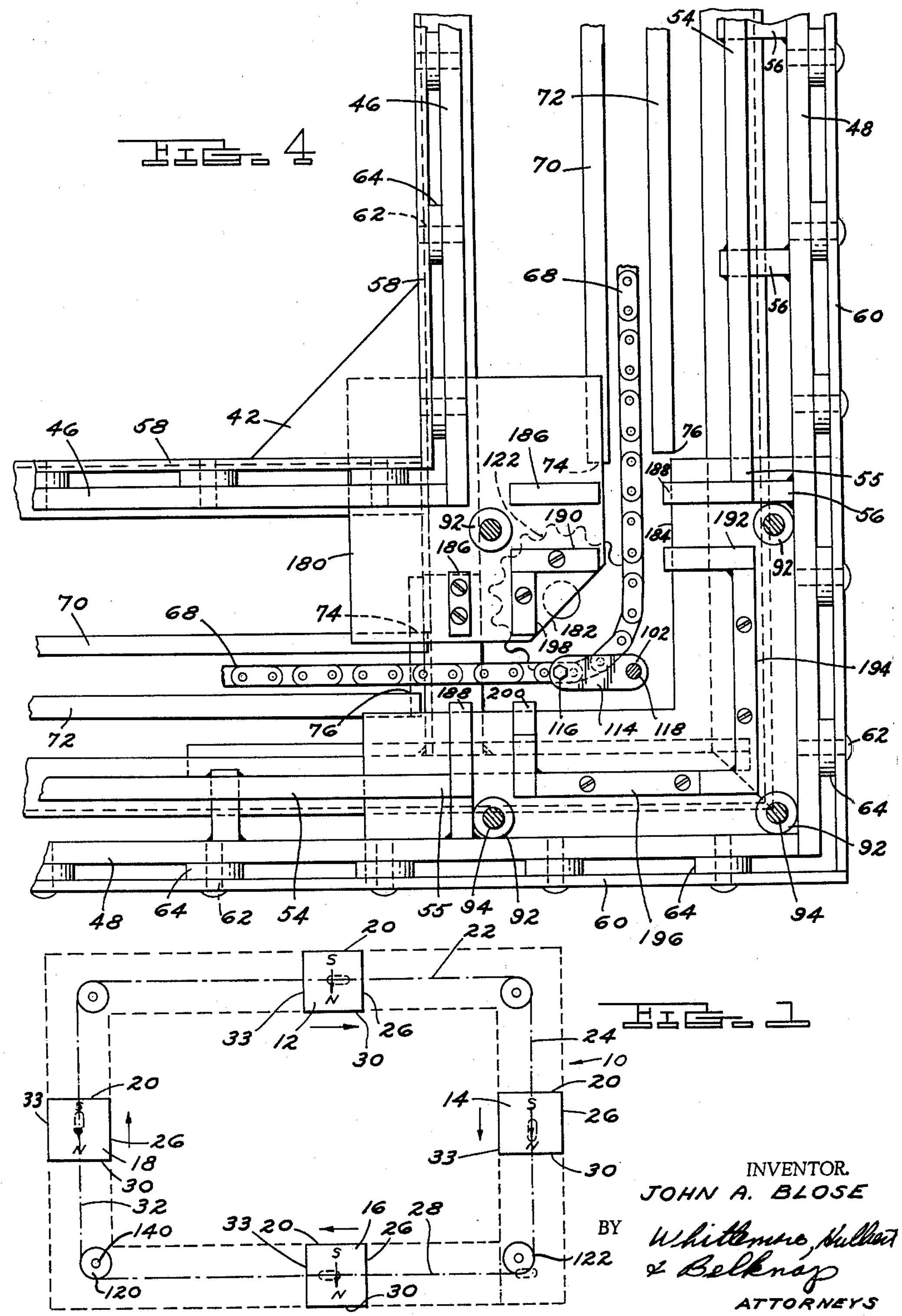

WORK CONVEYOR APPARATUS FOR USE WITH BUFFING OR GRINDING OR SPRAY PAINTING EQUIPMENT AND THE LIKE
Filed Jan. 29, 1962 4 Sheets-Sheet 2
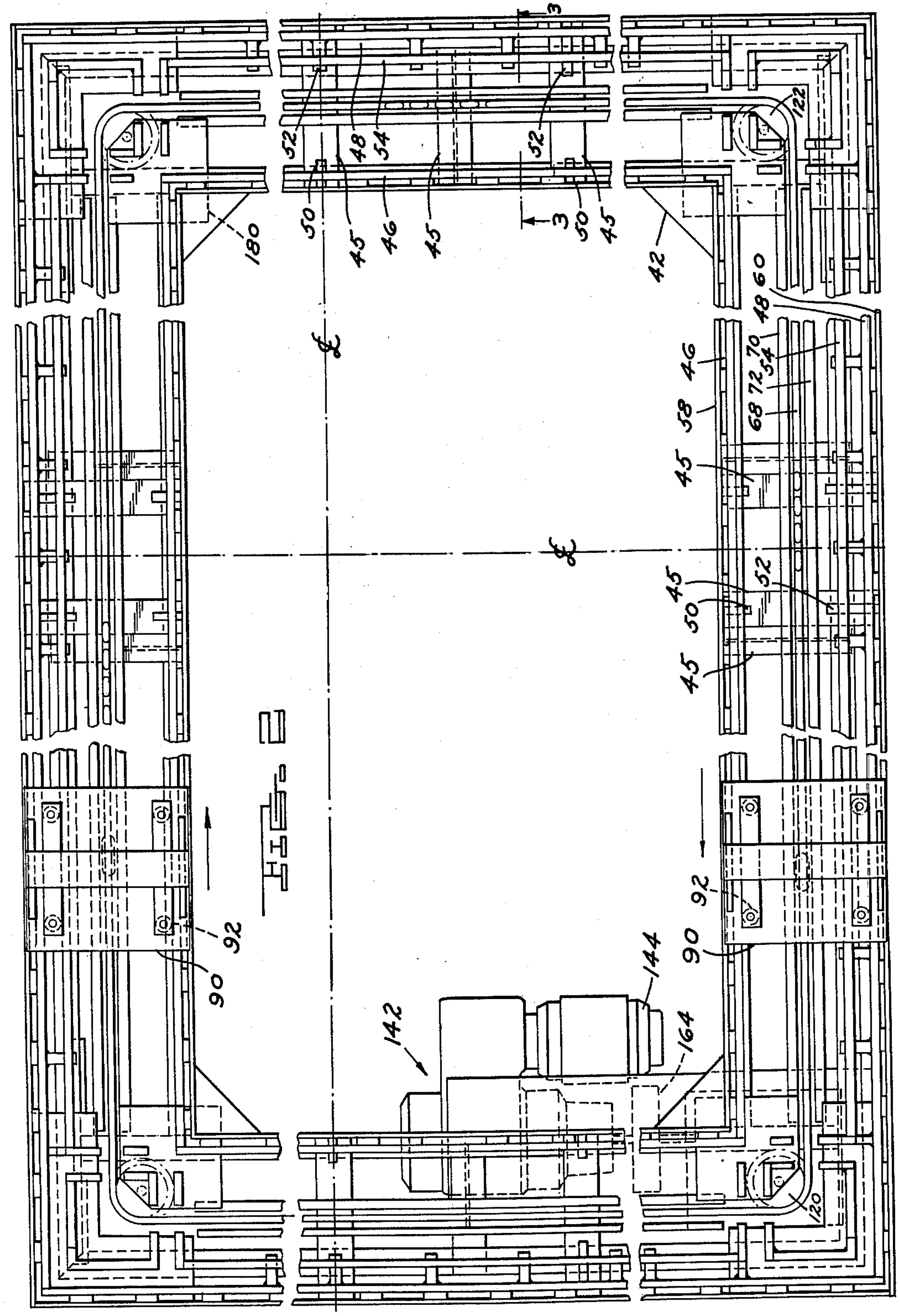

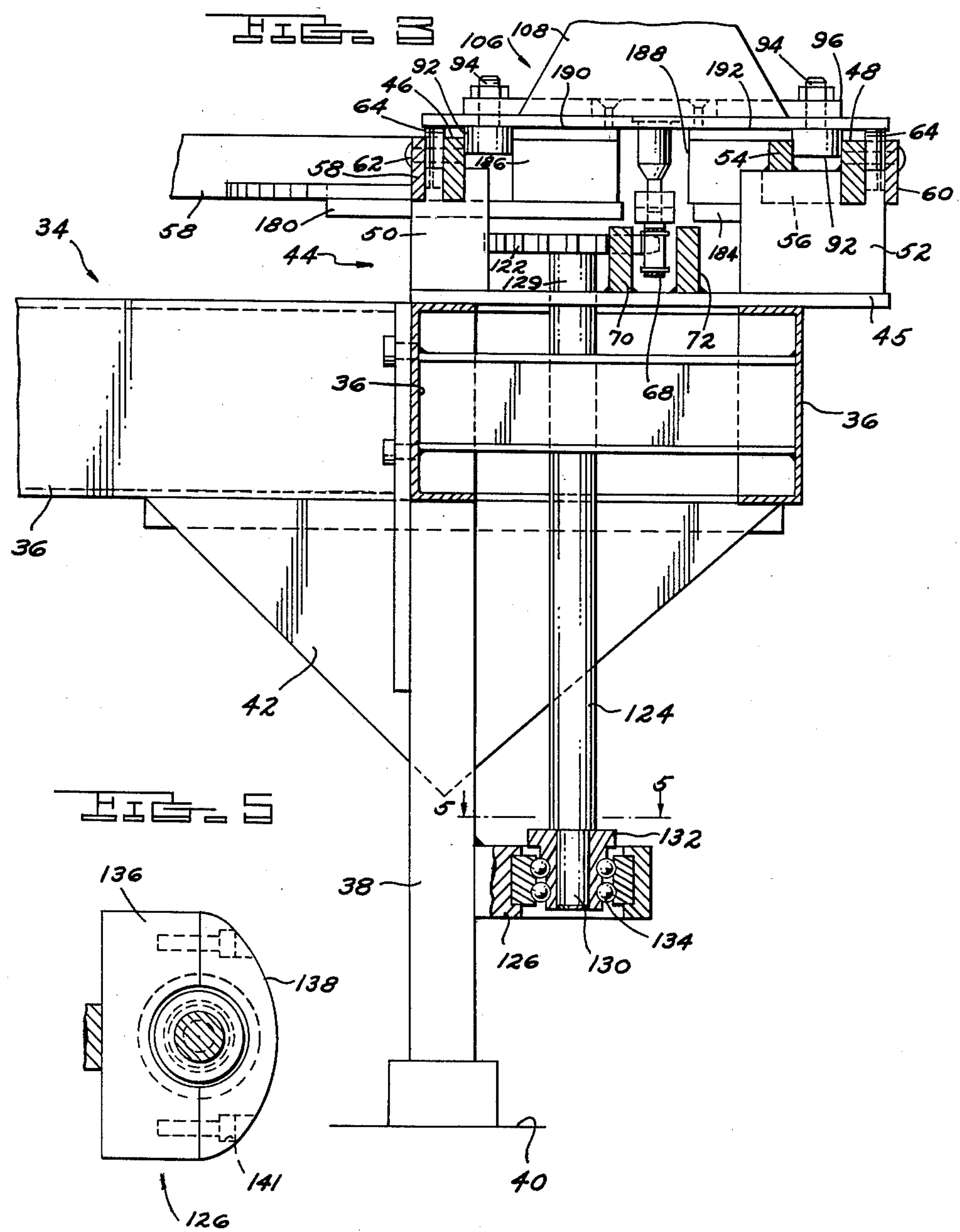
INVENTOR.
JOHN A. BLOSE
BY Whittemore, Hulbert & Belknap
ATTORNEYS

Nov. 5, 1963 J. A. BLOSE 3,109,533
WORK CONVEYOR APPARATUS FOR USE WITH BUFFING OR GRINDING OR SPRAY PAINTING EQUIPMENT AND THE LIKE
Filed Jan. 29, 1962 4 Sheets-Sheet 4
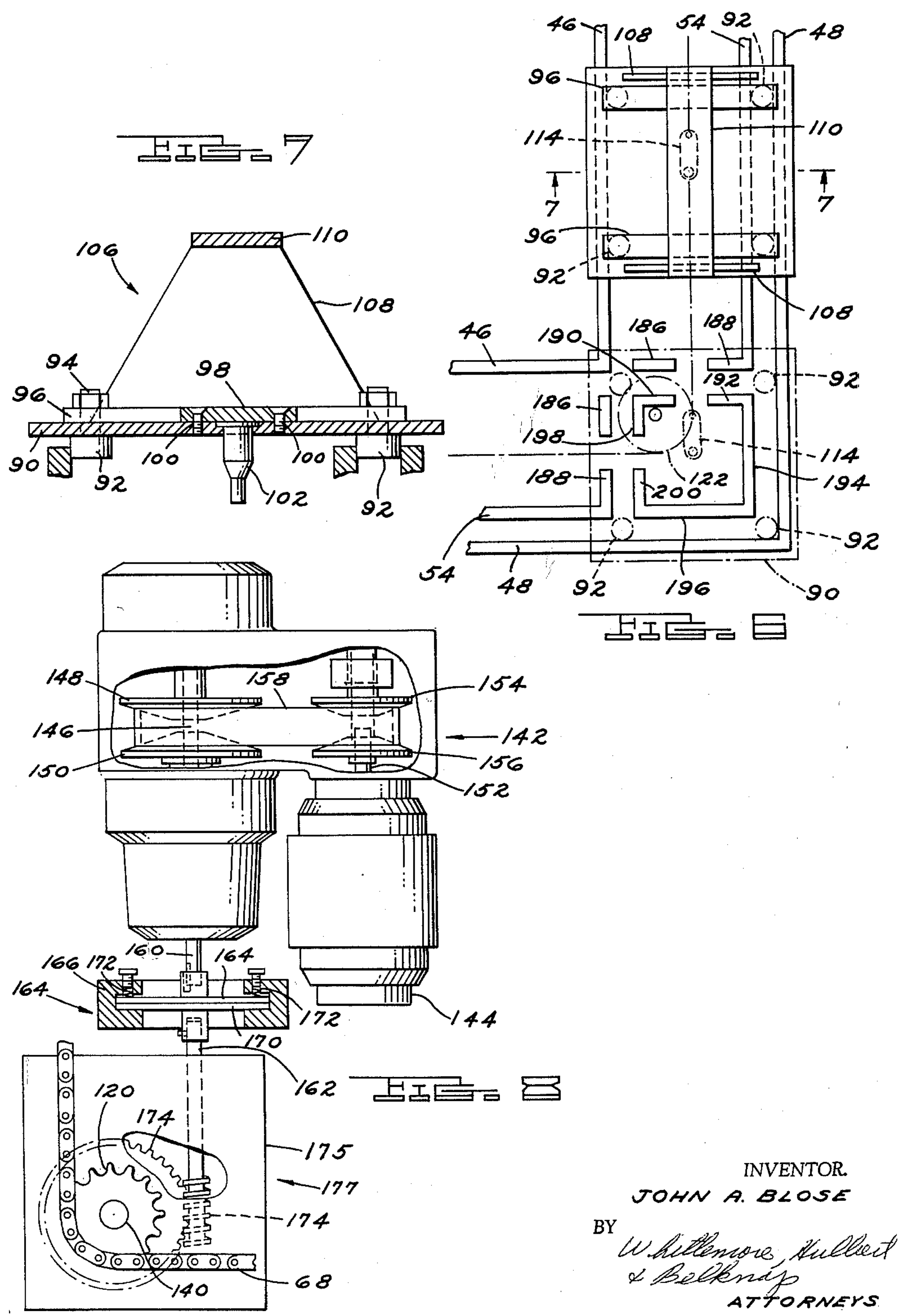
INVENTOR.
JOHN A. BLOSE
BY W. Whittemore, Hulbert & Belknap
ATTORNEYS United States Patent Office 3,109,533 Patented Nov. 5, 1963

3,109,533

WORK CONVEYOR APPARATUS FOR USE WITH BUFFING OR GRINDING OR SPRAY PAINTING EQUIPMENT AND THE LIKE

John A. Blose, Detroit, Mich., assignor to Grand Steel & Manufacturing Co., Clawson, Mich., a corporation of Michigan Filed Jan. 29, 1962, Ser. No. 169,537
10 Claims. (Cl. 198—181)

This invention relates to a work conveyor apparatus for use with buffing or grinding or spray painting equipment or any combination thereof which may be located at suitable work stations at spaced points of the perimeter of the apparatus so that the work carried by such apparatus may be buffed or ground or spray painted or any combination thereof.

One of the essential objects of the invention is to provide a work conveyor apparatus that has a movable work carrying platen thereon which presents four different sides of the work successively to four different work stations located respectively at spaced points about the perimeter of the apparatus as the platen travels about the apparatus.

Another object is to provide a work conveyor apparatus that includes means for maintaining the north-south orientation of the platen with respect to the apparatus throughout its travel about the apparatus.

Another object is to provide a work conveyor apparatus that includes an endless chain drive mechanism for moving the platen and a drag link interconnected between a part of the endless chain drive mechanism and the platen which is adapted to swing in an arcuate path as said part of the endless chain drive mechanism moves in a curved path around a corner of the apparatus to permit the platen to move in a rectilinear path around said corner of the apparatus to maintain the north-south orientation of the platen with respect to the apparatus.

Another object is to provide a work conveyor apparatus that includes guide bearings at the corners of the apparatus for facilitating the movement of the platen around said corners of the apparatus while maintaining the north-south orientation of the platen with respect to the apparatus.

Another object is to provide a work conveyor apparatus that is simple in construction, economical to manufacture, and efficient in operation.

Other objects, advantages and novel details of construction of this invention will be made more apparent as this description proceeds, especially when considered in connection with the accompanying drawings, wherein:

FIGURE 1 is a schematic illustration showing a rectangular shaped work conveyor apparatus upon which platens are carried.

FIGURE 2 is a top plan view of the work conveyor apparatus with certain sections removed.

FIGURE 3 is a sectional view taken along the line 3—3 of FIGURE 2.

FIGURE 4 is an enlarged plan view of one corner of the work conveyor apparatus.

FIGURE 5 is a top view partly in section taken along the line 5—5 of FIGURE 3.

FIGURE 6 is a plan view of one corner of the conveyor apparatus illustrating a work carrying platen thereon.

FIGURE 7 is a sectional view taken on the line 7—7 of FIGURE 6.

FIGURE 8 is a plan view of the drive mechanism for the work conveyor apparatus.

FIGURE 1 shows the broad concept of a substantially square or rectangular shaped conveyor 10 upon which platens 12, 14, 16 and 18 are carried. The north-south (N–S) indicia on each of the platens remains the same throughout the travel of the platens about the periphery of the conveyor 10, whereby side 20 of each of the platens will travel along the line 22 parallel to suitable buffing or grinding or spray painting equipment (not shown) to be buffed or ground or spray painted. Then the platen will travel along line 24 so that side 26 thereof will be parallel to the buffing or grinding or spray painting equipment (not shown) to be buffed or ground or spray painted. Then the platen will travel along line 28 so that side 30 of the platen will be parallel to the buffing or grinding or spray painting equipment (not shown) to be buffed or ground or spray painted. Then the platen will travel along line 32 so that side 33 of the platen will be parallel to buffing or grinding or spray painting equipment (not shown) to be buffed or ground or spray painted.

FIGURES 2 and 3 illustrate a conveyor apparatus having a rectangular shaped support 34. The support 34 consists of supporting base elements 36 arranged in a horizontal plane and rigidly secured together by welding, bolts or the like. The elements 36, as an example, may be made from channel-shaped structural steel beams. The supporting base elements 36 are secured to and carried by upright legs or posts 38 which rest upon the ground or floor 40. Usually the posts 38 are provided at the corners of the support 34. Reinforcing gussets 42 are provided at the corners of the support 34 and are rigidly secured to the supporting base elements 36 and to the legs or posts 38 as best illustrated in FIGURE 3.

A rectangular shaped frame 44 is carried by the top horizontal surface of the support 34. The frame 44 includes along each side of the support 34 a plurality of longitudinally spaced, transversely extending, substantially flat members 45. Each side of the frame 44 has spaced, parallel inner and outer guide rails 46 and 48. The guide rails 46 and 48 on each side of the frame 44 are supported on a plurality of brackets 50 and 52 respectively which are rigidly carried by the supporting base elements 36 to hold the inner and outer guide rails 46 and 48 vertically spaced from the top surface of the support 34.

The inner and outer guide rails 46 and 48 of parallel sides of the frame 44 intersect and are normal to their corresponding guide rails 46 and 48 respectively of the other parallel sides of the frame 44 to form a continuous track 50. One pair of inner and outer guide rails 46 and 48 forms one section of a corner while another pair of guide rails 46 and 48 which is normal thereto forms the other section of a corner.

Each side of the frame 44 is also provided with a third or intermediate guide rail 54 which is parallel to and spaced inwardly from the outer guide rail 48 a relatively short distance substantially equal to the diameter of a plates roller 92 to be subsequently described. The intermediate guide rails 54 of the frame 44 each have a length slightly less than the length of the inner guide rail 46 and terminates at the start of the corners of the frame 44 as indicated at 55 in FIGURE 4. The intermediate guide rails 54 are rigidly carried by transversely extending brackets 56 carried by the outer guide rail 48.

Each side of the frame 44 includes inner and outer retainer rails 58 and 60 which cooperate with the adjacent inner and outer guide rails 46 and 48 respectively to support stub shafts 62 for supporting rollers 64 for the platens to be subsequently described. The inner and outer retainer rails 58 and 60 on parallel sides of the frame 44 intersect and are normal to the remaining inner and outer retainer rails 58 and 60 respectively as best illustrated in FIGURES 2 and 4. The stub shafts 62 and rollers 64 are equally spaced lengthwise of each side of the frame 44.

An endless power driven chain mechanism 68 is provided on the frame 44. A pair of chain guide members 70 and 72 are appropriately spaced lengthwise of each side of the frame 44 on opposite sides of the the chain mechanism 68 as best illustrated in FIGURES 3 and 4. The chain guide members 70 and 72 are carried by the support members 45 and are fixedly connected thereto by welding or other appropriate fastening operations. The chain guide members 70 and 72 have their ends terminating at 74 and 76 respectively as best illustrated in FIG. 4 so as not to interfere with the construction of the corners as will be explained later on in the specification.

Mounted on the frame 44 are a plurality of platens 90. Normally there are twelve platens 90 on the apparatus at spaced points thereof and each platen carries the work (not shown) to be buffed, or ground, or spray painted. Each platen 90 has on the underside thereof rollers 92. The rollers 92 are four in number and are located adjacent the corners of each platen 90 as best illustrated in FIGURE 6. Each roller 92 is carried by a stub shaft 94 which extends upwardly through the platen 90 and upwardly through elongated strengthening plates 96 on the upper surface of each platen 90. At the center of each platen 90 is a retainer plate 98 which is fastened to the platen 90 by bolts 100. The retainer plate 98 carries a drive pin 102 which is appropriately connected to the endless chain drive mechanism 68 as will be subsequently described.

Each platen 90 may carry any suitable superstructure such as the fixture 106 for carrying a casting (not shown).

The fixture 106 for the work (not shown) is carried by each platen 90 and includes a pair of side plates 108 located on the platen 90 as best illustrated in FIGURES 6 and 7. A flat plate 110 bridges the space between the end plates 108. The casting, as an example, may be provided with studs which are adapted to be received in holes provided in the fixture for mounting purposes.

Platens 90 each have a corresponding drag link 114. The drag links 114 are pivotally connected to the endless chain mechanism 68 by pivot pins 116, at longitudinally spaced points thereof. The drive pin 102 of each platen 90 is received in an opening 118 provided in the corresponding drag link 114 to pivotally interconnect the platen 90 with the chain drive mechanism 68. Normally the drag links 114 overlie the links of the chain drive mechanism 68. However, when the platens 90 move around the corners of the conveyor apparatus so as to maintain the rectilinear movement of said platens 90 around the corners, the drag links 114 swing outwardly in an arcuate path to an outward position as illustrated in FIGURE 4. Except for the corners of the conveyor apparatus the drag links 114 are in alignment with the endless chain mechanism 68. Such drag links 114 are able to swing out only at the corners of the conveyor apparatus to compensate for the different paths that are taken by the platens 90 and the endless chain mechanism 68 at such corners. In this connection it will be noted by referring to FIGURES 2 and 4 that each platen 90 travels in a straight line and that each corner of the apparatus traveled thereby is a right angle or 90° corner, whereas the endless chain mechanism 68 travels in a curved path around a drive sprocket 120 at one corner as best illustrated in FIGURE 8 and around three idler sprockets 122 at the remaining corners of the apparatus, one of which is best shown in FIG. 4.

Supporting each idler sprocket 122 as best illustrated in FIGURE 3 is an upright shaft 124 carried by a bracket 126 that is secured to an adjacent leg or post 38 such as by welding. The upper end 129 of the shaft 124 carries the idler sprocket 122 while the lower end 130 of the shaft 124 is received in a bushing 132 which is rotatably mounted in a ball bearing race 134 which is housed in the bracket 126. The bracket 126 includes a base 136 having a removable cap 138 which is connected to the base 136 by a plurality of screws or bolts 141.

Supporting the drive sprocket 120 is an upright drive shaft 140 as best illustrated in FIGURE 8 which is operatively connected to a Reeves variable speed drive 142 which is in the form of a reduction gearing driven by a constant speed electric motor 144. The conventional Reeves drive 142 includes a shaft 146 on which is mounted a variable fixed disc 148 and a variable sliding disc 150. The motor 144 has an output shaft 152 which has a sliding disc 154 and a fixed disc 156 thereon. A belt 158 connects all of said discs and is driven by the motor 144. The output end 160 of the shaft 146 is separated from the driven shaft 162 by a friction clutch 164 which serves as a safety device.

The clutch 164 has a housing 166 and a pair of discs 168 and 170 which are received in an anular groove provided in the interior of the housing 166. The discs 168 and 170 are spring loaded by means of the springs 172 which are adjustable. The disc 168 is connected to the output end 160 of the shaft 146. The disc 170 is connected to the driven shaft 162. The driven shaft 162 has a worm 174 thereon which is in mesh with a worm gear 176 carried on the lower end of the upright shaft 140. The shaft 162, worm 174 and worm gear 176 are located in the housing 175 as part of the reduction gear box 177.

The energization of the drive motor 144 is effective to actuate the Reeevs drive 142 to in turn rotate the worm 174 and drive the worm gear 176. As a result the shaft 140 having the drive sprocket 120 thereon is effective to drive the chain mechanism 68 and move the plurality of platens 90 on the rollers 64 about the perimeter of the conveyor apparatus.

Referring once again to FIGURES 3 and 4, there is illustrated a typical corner construction of the conveyor apparatus. Each corner of the apparatus has a substantially flat supporting plate 180 having a chamfered corner 182 so as not to interfere with the chain drive mechanism 68. Each corner of the apparatus is also provided with an L-shaped substantially flat supporting plate 184 which is located on the frame 44 so as not to interfere with the chain drive mechanism 68. A first pair of transversely extending, relatively short guide members 186 and 188 are provided on opposite sides of the chain mechanism 68 at the entrance and at the exit to each corner. A second pair of guide members 190 and 192 are parallel to and spaced from one pair of the guide members 186 and 188 respectively at the entrance to each corner to provide a track for the rollers 92 of the platens 90 and to also provide at the top surface thereof wear sufaces for the platens 90 when the platens 90 are disengaged from the rollers 64 as they traverse a corner of the apparatus.

Additional intermediate wear-guide members 194 and 196 are parallel to and spaced from the outer guide rails 48 to provide tracks for the rollers 92 of the platens 90. Additional wear plates 198 and 200 are provided at each corner and are perpendicular to guide members 190 and 196 respectively. It should be observed that certain of the guide members 190, 192, 194 and 196 also have top bearing surfaces or wear surfaces along with wear plates 198 and 200 which facilitate the movement of the platens 90 about the corners of the conveyor apparatus when the platens 90 are disengaged from the rollers 64. The top surfaces of said guide members and wear plates are located in a horizontal plane which is tangent to rollers 64. When the platen 90 has been moved to the position illustrated in FIGURE 4 the rollers 92 of the platen 90 are aligned with the relatively short lengths of tracks provided at the corner. With such a construction the platens 90 are moved in rectilinear paths about the entire apparatus.

Normally there are twelve platens 90 on the apparatus at spaced points thereof and each platen 90 carries the work (not shown) to be buffed or ground or spray painted. With such a construction four different sides of the work are exposed to buffing or grinding or spray painting equipment as it travels about the conveyor apparatus. At the lowest speed of the Reeves drive 142, 375 platens pass a given point in one hour. However, if the operator desires to increase from 375 platens to 500 platens per hour per given point then a handcrank (not shown) is utilized to accelerate the Reeves drive 142.

What I claim as my invention is:

1. A work conveyor apparatus comprising a frame, inner and outer guide rails mounted on said frame at each side thereof, with each pair of adjacent inner guide rails abutting and at substantially a right angle to one another and with each pair of adjacent outer guide rails abutting and at substantially a right angle to one another, each outer guide rail being substantially parallel to and spaced from the corresponding inner guide rail, said rails forming an endless track with four substantially 90° corners, a plurality of longitudinally spaced rollers mounted on each of said inner and outer rails and extending upwardly beyond the top surfaces thereof, with the axis of each roller arranged substantially perpendicular to the rail on which the roller is mounted, a non-rotatable platen movable on said rollers in a rectilinear path around said track and having a plurality of rollers on the underside thereof, said last-mentioned rollers having their axes substantially perpendicular to the axes of said first-mentioned rollers, the underside of said platen engaging said first-mentioned rollers as said platen moves along said track with said second-mentioned rollers engaging sides of said rails, said platen being provided with a downwardly extending drive pin, a drive mechanism including an endless movable chain and four corner sprockets supported by said frame beneath said rails, said chain being movable in a path substantially following the centerline of the track except when the chain moves in a curved path around said sprockets, a connecting drag link interposed between said chain and said drive pin, said drag link overlying said chain as it moves said platen except when said platen traverses one of said corners at which time said link moves in an arcuate path around the corresponding sprocket while maintaining the orientation of said platen with respect to said track, and means for driving said chain to effect movement of said platen.

2. Work conveyor apparatus defined in claim 1 wherein each of said outer guide rails is provided with an inwardly spaced intermediate guide rail, each intermediate guide rail being spaced from the corresponding outer guide rail a distance substantially equal to the diameter of the rollers on said platen.

3. Work conveyor apparatus defined in claim 1 wherein a plurality of platens are provided, each platen having a drive pin and a corresponding drag link connecting the drive pin to said chain.

4. Work conveyor apparatus defined in claim 1 wherein guide bearing elements are provided at each of said corners for facilitating the movement of said platen around said corner when said platen is disengaged from said first-mentioned rollers, the top surfaces of said elements lying in a plane which is tangent to said first-mentioned rollers.

5. Work conveyor apparatus defined in claim 1 wherein each side of said frame is provided with a pair of laterally spaced longitudinally extending guide members between which said chain moves, the ends of said guide members terminating a distance from said corners.

6. Work conveyor apparatus defined in claim 1 wherein said last-mentioned means includes motor driven means for driving one of said sprockets to effect movement of said chain and said platen.

7. A work conveyor apparatus comprising a frame, inner and outer guide rails mounted on said frame at each side thereof, with each pair of adjacent inner guide rails at substantially a right angle to one another and with each pair of adjacent outer guide rails at substantially a right angle to one another, each outer guide rail being substantially parallel to and spaced from the corresponding inner guide rail, said rails forming an endless track with four substantially 90° corners, a plurality of longitudinally spaced rollers mounted on each of said inner and outer rails and extending upwardly beyond the top surfaces thereof, a non-rotatable platen movable on said rollers in a rectilinear path around said track and having a plurality of rollers on the underside thereof, the underside of said platen engaging said first-mentioned rollers as said platen moves along said track with said second-mentioned rollers engaging sides of said rails, said platen being provided with a drive pin, a drive mechanism including an endless movable chain and four corner sprockets supported by said frame, said chain being movable in a path substantially following said track except when the chain moves in a curved path around said sprockets, a connecting drag link interposed between said chain and said drive pin, said drag link following said chain as it moves said platen except when said platen traverses one of said corners at which time said link moves in an arcuate path around the corresponding sprocket while maintaining the orientation of said platen with respect to said track, and motor driven means for driving one of said sprockets to effect movement of said chain and said platen.

8. Work conveyor apparatus defined in claim 7 wherein each of said outer guide rails is provided with an inwardly spaced intermediate guide rail, each intermediate guide rail being spaced from the corresponding outer guide rail a distance substantially equal to the diameter of the rollers on said platen.

9. Work conveyor apparatus defined in claim 7 wherein a plurality of platens are provided, each platen having a drive pin and a corresponding link connecting the drive pin to said chain.

10. Work conveyor apparatus defined in claim 7 wherein guide bearing elements are provided at each of said corners for facilitating the movement of said platen around said corner when said platen is disengaged from said first-mentioned rollers, the top surfaces of said elements lying in a plane which is tangent to said first-mentioned rollers.

References Cited in the file of this patent

UNITED STATES PATENTS

| | | |
|---|---|---|
| 2,227,145 | Lex | Dec. 31, 1940 |
| 2,277,309 | Doll | Mar. 24, 1942 |
| 2,856,054 | Fausset | Oct. 14, 1958 |
| 2,903,120 | Thomas | Sept. 8, 1959 |
| 2,999,579 | Kostrzewa | Sept. 12, 1961 |